US006827921B1

(12) United States Patent
Singhal et al.

(10) Patent No.: US 6,827,921 B1
(45) Date of Patent: Dec. 7, 2004

(54) NANOSTRUCTURED $Li_4Ti_5O_{12}$ POWDERS AND METHOD OF MAKING THE SAME

(75) Inventors: Amit Singhal, Piscataway, NJ (US); Ganesh Skandan, Piscataway, NJ (US)

(73) Assignee: Nanopowder Enterprises Inc., Piscataway, NJ (US)

( * ) Notice: Subject to any disclaimer, the term of this patent is extended or adjusted under 35 U.S.C. 154(b) by 174 days.

(21) Appl. No.: 10/058,715

(22) Filed: Jan. 28, 2002

Related U.S. Application Data

(60) Provisional application No. 60/265,290, filed on Feb. 1, 2001.

(51) Int. Cl.[7] .......................... C01G 23/00; C01D 15/00
(52) U.S. Cl. .................................... 423/598; 423/179.5
(58) Field of Search .............................. 423/179.5, 598

(56) References Cited

U.S. PATENT DOCUMENTS

| | | | | |
|---|---|---|---|---|
| 4,026,811 A | * | 5/1977 | Readey et al. ............. | 252/63.2 |
| 4,567,031 A | * | 1/1986 | Riley ......................... | 423/593 |
| 4,649,037 A | * | 3/1987 | Marsh et al. ............... | 423/338 |
| 5,545,468 A | | 8/1996 | Koshiba et al. ............. | 429/218 |
| 6,221,531 B1 | | 4/2001 | Vaughey et al. ......... | 429/231.1 |
| 6,294,011 B1 | * | 9/2001 | Hedouin et al. ............ | 106/439 |
| 6,319,421 B1 | * | 11/2001 | Yun et al. .............. | 252/62.9 R |
| 6,365,301 B1 | * | 4/2002 | Michot et al. .............. | 429/307 |
| 6,379,843 B1 | * | 4/2002 | Yamasaki et al. ........ | 429/231.5 |
| 6,436,577 B1 | * | 8/2002 | Kida et al. ............. | 429/231.95 |
| 6,475,673 B1 | * | 11/2002 | Yamawaki et al. ...... | 429/231.5 |

OTHER PUBLICATIONS

K. Zaghib et al, J. of Power Sources vol. 81–82, Sep. 1999, pp 300–305, Electro Chemical Study.
J. Electrochem Soc., vol. 145 No. 8, Aug. 1998 pp 2609–2614 Preparation of Micron Sized $Li_4Ti_5O_{12}$.
J. Electrochem Soc., vol. 148 (8) A930–A939 (2001) "An Asymmetric Hybrid Nonaqeuoss . . . Cell".

* cited by examiner

*Primary Examiner*—Cam N. Nguyen
(74) *Attorney, Agent, or Firm*—William L. Botjer

(57) ABSTRACT

Ultrafine powders of $Li_4Ti_5O_{12}$ with particles in the size range of 25–500 nm. The average size of particles is about 500 nm of less, preferably about 300 nm or less. The particles are composed of nanocrystallites, which have an average size about 30 nm. This invention also includes the method of producing these ultrafine $Li_4Ti_5O_{12}$ particles. The process utilizes (i) nanoparticles of $TiO_2$, (ii) a lithium salt, and (iii) an organic solvent with a boiling point in the range of 70–230° C. The process is carried out at pressures in the range of 0.5 to 10 atmospheres. The inorganic salt of Li is mixed with $TiO_2$ nanoparticles (~20–25 nm) in the organic solvent. The solution is heated to a temperature and at a pressure to facilitate the diffusion of Li ions in to nanoparticles. After completion of the reaction, the powder is heat treated in $O_2$ or an inert gas to form the desired phase.

19 Claims, 4 Drawing Sheets

NANOSTRUCTURED $Li_4Ti_5O_{12}$ POWDERS AND METHOD OF MAKING THE SAME

CROSS REFERENCE TO RELATED APPLICATIONS

This application claims priority of U.S. provisional application No. 60/265,290 filed Feb. 1, 2001.

BACKGROUND OF THE INVENTION

This invention relates to the production of nanostructured or ultrafine particles (i.e. particles of less than 1 micron and preferably in the size range of 25–500 nm) of lithium titanate ($Li_4Ti_5O_{12}$) a compound, which is an important anode material for rechargeable energy storage devices such as Li based batteries and asymmetric hybrid cells. The electrochemical performance of nanostructured lithium titanate exceeds that of coarse (large) size particles of the same material.

Nanomaterials-derived products are being actively pursued for use in a wide range of applications, including electrochemical energy storage and generation, chemical sensors, optoelectronics, semiconductors, wear and scratch resistant coatings, and heat transfer. The interest stems from the fact that researchers see immense potential for improving functional properties of components and devices by nanostructuring. In some cases, the use of nanoparticles as feedstock material can facilitate processing of an improved end product at a lower cost. However, while the use of nanoparticles as starting material can lead to benefits in a number of applications, researchers must tailor the structure and composition of the starting powder in order to maximize the property enhancements and performance and realize the true potential of nanomaterials.

Over the past several years, a number of techniques have been developed for the production of ceramic nanoparticles. These include: laser ablation, microwave plasma synthesis, precipitation from a solution, spray pyrolysis, plasma arc synthesis, hydrodynamic cavitation, and gas condensation using either a physical evaporative source or chemical precursors. Vapor phase processes are capable of producing well-defined spherical nanoparticles with narrow particle size distribution. Several single component oxides can be produced by an atmospheric flame process at low cost. However, it is extremely difficult to control the composition of multi-component ceramic powders because of the significant variations in the vapor pressures of different constituents. On the other hand, solution-based processes have an excellent control on the composition, but particle characteristics are not as good as those of produced by any of the vapor phase process. The synthesis method discussed in this patent application bridges the gap between liquid and vapor phase processing routes to produce nanostructured doped/multi-component ceramic powders with well-defined particle characteristics.

SUMMARY OF THE INVENTION

This invention relates to nanostructured (or ultrafine) $Li_4Ti_5O_{12}$ powders with a spinel-type structure with improved Li-ion diffusion. $Li_4Ti_5O_{12}$ can also be written as $Li(Li_{0.33}Ti_{1.66})O_4$. A spinel structure consists of eight subcells, and each subcell has four oxygen atoms, four octahedral interstices and eight tetrahedral interstices. In each elementary cell, two octahedral sites are filled with Li and Ti atoms in a ratio of 0.33: 1.66 and one tetrahedral site with one Li atom.

These materials are of particular interest as anode for Li-based rechargeable energy storage devices. The present invention includes nanostructured (or ultrafine) $Li_4Ti_5O_{12}$ powders and method of making the same. The present invention relates to a general method for the production of nanostructured (or ultrafine) $Li_4Ti_5O_{12}$ powders. $Li_4Ti_5O_{12}$ is an attractive negative electrode material for secondary rechargeable energy storage devices wherein Li-ions are cycled in and out during a charging and a discharging process of the device. Three Li ions can be inserted into the structure according to the reaction:

$$Li_4Ti_5O_{12} \leftrightarrows Li_7Ti_5O_{12} \tag{1}$$

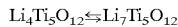

The reaction occurs at approximately 1.5V vs metallic lithium, thereby providing a relatively safe electrode system compared to carbon in which insertion of Li ions occurs at a voltage range of 0.0 to 0.5 with respect to Li. However, safety is gained at the expense of cell voltage and energy density. From a structural viewpoint, $Li_4Ti_5O_{12}$ is an ideal anode for Li-based rechargeable batteries, because the Li insertion into the cubic $Li_4Ti_5O_{12}$ spinel structure occurs without any change in the lattice parameter (8.36 Å); thereby providing an extremely stable electrode structure. Negative electrodes made of $Li_4Ti_5O_{12}$ material can undergo many hundreds of cycles without structural disintegration. Moreover, lithium insertion causes a first-order displacement of the tetrahedrally-coordinated Li ions in the $Li_4Ti_5O_{12}$ spinel structure into octahedral sites to generate the ordered rock-salt phase $Li_7Ti_5O_{12}$. The insertion (and extraction) of lithium is thus a two-phase reaction which provides a constant voltage response at~1.5V. Furthermore, the voltage of a $Li/Li_{4+x}Ti_5O_{12}$ cell changes abruptly at the end of discharge and charge. Thus, a $Li_{4+x}Ti_5O_{12}$ spinel electrode provides very sharp end-of-charge and end-of-discharge indicators which is useful for controlling cell operation and preventing overcharge and overdischarge.

Several of the commercial applications, including hybrid electric vehicles, uninterruptable power sources (UPS) and power tools, require that batteries be able to charge to their full capacity in a short period of time, less than 30 minutes. However, anodes made of micron-sized or larger $Li_4Ti_5O_{12}$ spinel particles do not exhibit good rate capability because of poor Li-ion diffusion.

In the past, attempts have been made to improve the electronic conductivity of $Li_4Ti_5O_{12}$ phase by substituting Li-ions on octahedral sites with Mg or Al. U.S. Pat. No. 6,221,531 to Vaughey et al. discloses electrically conductive $Li[Ti_{1.67}Li_{0.33-y}M_y]O_4$ (M=Al or Mg) powders. However, improving electronic conductivity of $Li_4Ti_5O_{12}$ phase will not enhance its charging rate capabilities as the electronic conductivity of $Li_4Ti_5O_{12}$ anode is important only during the discharging process. The present invention focuses on developing $Li_4Ti_5O_{12}$ materials with high Li-ion diffusion capabilities, which implies high ionic conductivity, and hence high charge rate capabilities.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
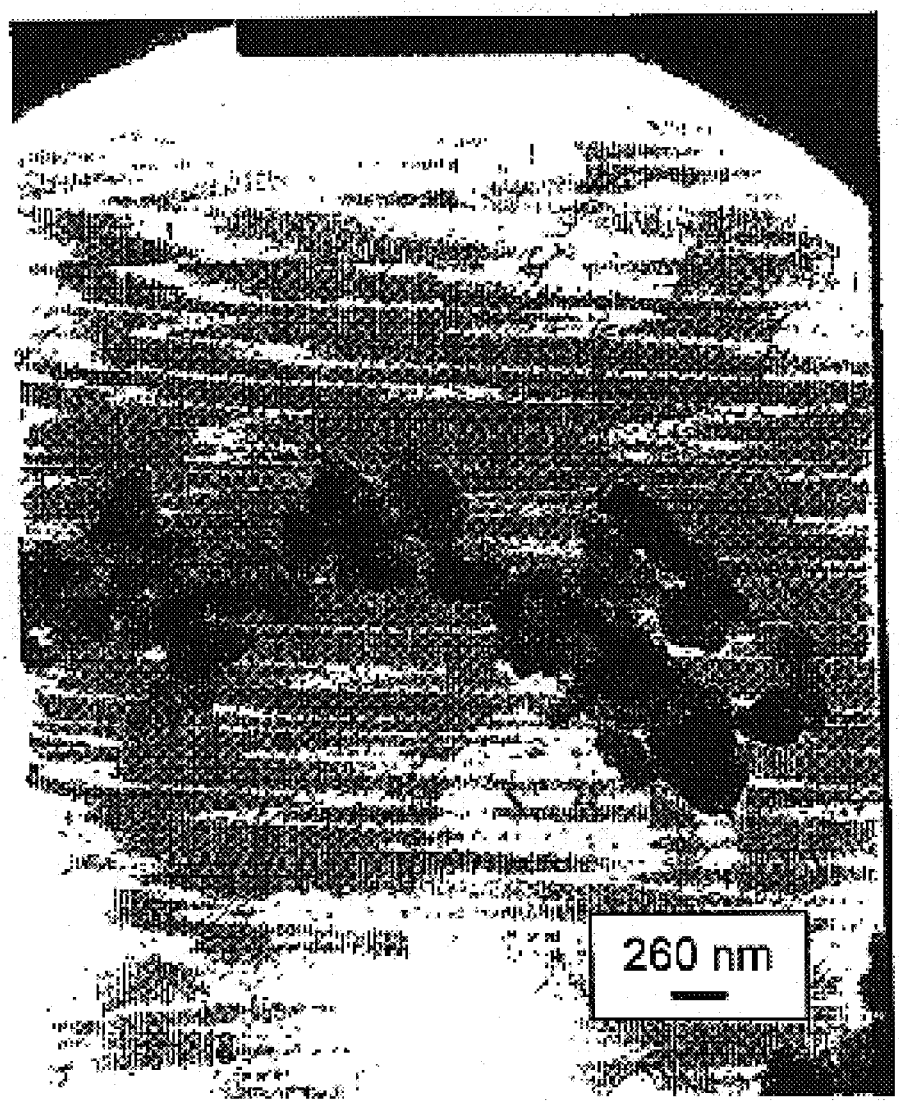
FIG. 1 is a photomicrograph of the $Li_4Ti_5O_{12}$ particles produced in accordance with the present invention.

In one aspect, the invention provides ultrafine powders of $Li_4Ti_5O_{12}$ with particles in the size range of 25–500 nm. The average size of particles is about 500 nm or less, preferably about 300 nm or less. In another aspect, particles are composed of nanocrystallites, which have an average size about 30 nm. This invention also includes the method of producing these ultrafine $Li_4Ti_5O_{12}$ particles. The process utilizes (i) nanoparticles of $TiO_2$, (ii) a lithium salt such as, lithium nitrate, lithium iodide, lithium hydroxide, lithium chloride and lithium carbonate, and (iii) an organic solvent with a boiling point in the range of 70–230° C. The process carried out at pressures in the range of 0.5 to 10 atmospheres. An inorganic salt of Li is mixed with $TiO_2$ nanoparticles (~20–25 nm) in an organic solvent such as, hexanol. The solution is heated (preferably in a refluxing operation) to a high enough temperature (70–230° C.) at a pressure to facilitate the diffusion of Li ions in to nanoparticles. After completion of the reaction, the powder is heat treated (annealed) in $_{O2}$ at a relatively low temperature (500–800° C.) to form the desired phase. The heat treatment can also take place in an atmosphere containing an inert gas such as, $N_2$, He or Ar. Powders were annealed at several temperatures to ensure the complete transformation to a $Li_4Ti_5O_{12}$ phase. Once the transformation to $Li_4Ti_5O_{12}$ phase has completed, further high-temperature annealing by promoting the sintering between particles will form coarse particles. Therefore, the lowest possible annealing temperature needs to be utilized in order to maintain the ultrafine nature of $Li_4Ti_5O_{12}$ particles.

In contrast to solid state synthesis techniques, the present process leads to ultrafine particles, which are composed of nanocrystallites. Additionally, this process enabled us to produce discrete particles with precise composition, which was not possible by either conventional sol-gel or vapor phase processes. The process described in the present invention utilizes an organic solvent with a boiling point of 79° C. or more, preferably about 125° C. or more and more preferably from about 150 to 230° C. The process for making ultrafine multi-component oxide particles described in the present invention is quite different from the well-known hydrothermal process in which particles are produced by heating chemical precursors or precursor particles, which are dissolved or suspended in water, at a high pressure (>4 atmospheres) for an extend period of time.

Electrodes made of nanostructured (or ultrafine) $Li_4Ti_5O_{12}$ powders in both $Li/Li_4Ti_5O_{12}$ test cells and asymmetric hybrid cells have shown excellent rate capabilities as shown by: Amatucci, Glenn G., Fadwa, Badway, Pasquier, Aurelien D., and Zheng, T., "An Asymmetric Hybrid Nonaqueous Energy Storage Cell", *Journal of the Electrochemical Society*, 148, A930 (2001). Asymmetric hybrid cells made with ultrafine $Li_4Ti_5O_{12}$ powders as anodes charged to 92% of their initial capacity at a rate of 10C Cells made with ultrafine $Li_4Ti_5O_{12}$ as electrodes discharged to 90% of their initial capacity at a rate of 10C (wherein 1 C=1 hr charge or discharge, 10C=6 min. charge or discharge), while $Li/Li_4Ti_5O_{12}$ cells with electrodes consisting of coarse $Li_4Ti_5O_{12}$ discharged only to 30% at a rate of 10C. Furthermore, electrodes made of $Li_4Ti_5O_{12}$ powders, which are prepared by the solid-state reaction between $Li_2CO_3$ and nano-$TiO_2$, discharged only to 75% of their initial capacity at a rate of 10C. Smaller particles have shorter diffusion distances for intercalated Li-ions, resulting in a higher charge rate for intercalated anodes.

Ultrafine $Li_4Ti_5O_{12}$ particles having diameters substantially less than a micron have been produced. The preferable particle size is in the range of 50–400 nm as shown in the TEM photomicrograph of FIG. 1. Ultrafine $Li_4Ti_5O_{12}$ particles are also composed of nanocrystallites: the preferable nanocrystallite size is in the range of 20–100 nm. The average crystallite size of 30 nm was determined from the broadening of two X-ray peaks: $2\theta=18.5°$ and $56.5°$ in the x-ray diffraction pattern of FIG. 2.

Figure 3:
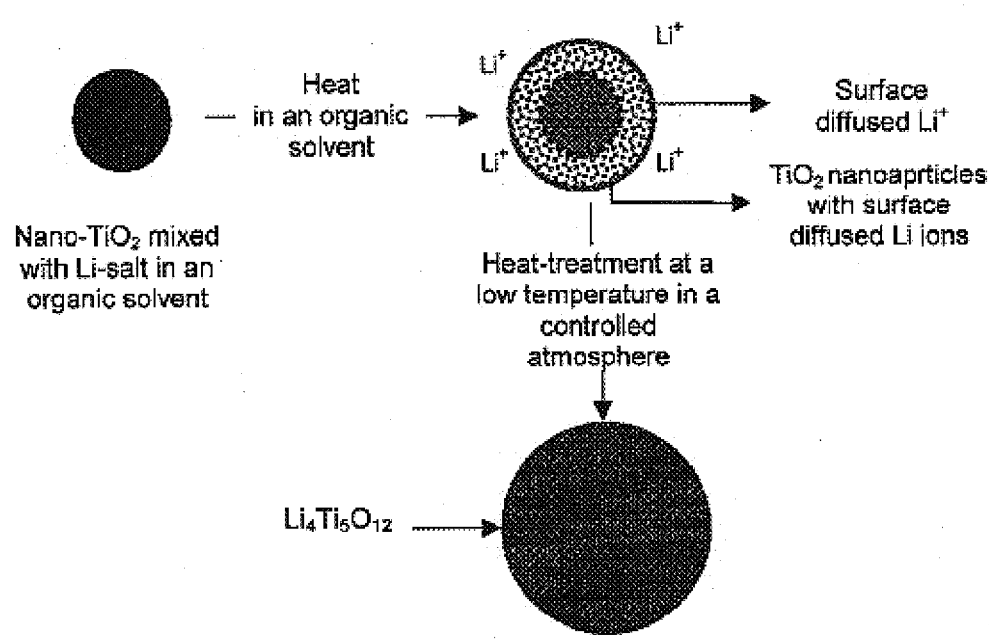
FIG. 3 is a schematic diagram of the present process to produce nanostructured $Li_4Ti_5O_{12}$

Ultrafine particles of $Li_4Ti_5O_{12}$ are formed by a wet chemistry method in which an inorganic lithium salt is mixed with $TiO_2$ nanopowders, which have an average primary particle size 100 nm or less, preferably 50 nm or less, and most preferably 25 nm or less. ($Li_4Ti_5O_{12}$ particle formation does not depend on how the $TiO_2$ nanopowders have been produced). The mixture of lithium salt and $TiO_2$ nanopowders is refluxed in a high boiling point organic solvent in order to facilitate the diffusion of Li ions into nanoparticles. Since the precursor particles have very high surface/volume ratio, the majority of Li ions are likely to diffuse on the surface of particles. After completion of the reaction, the powder is heat treated in a controlled atmosphere at a relatively low temperature to form the desired phase. In contrast to solid state synthesis techniques, our novel process leads to an ultrafine particle size with precise control of the composition. The schematic of the process to produce nanostructured $Li_4Ti_5O_{12}$ is shown in FIG. 3. The diffusion of Li ions into particles depends upon the three factors:

(1) The synthesis method utilizes an organic solvent, and thus prevents the formation of hydration layer around the dopant cation. A hydration layer increases the overall size of cations, and as a result, inhibits diffusion of cations in nanoparticles at low temperatures ($\leq 200°$ C.) and at one atmospheric pressure. However, typically, in case of a hydrothermal process, inorganic salts of different constituents are dissolved in water, and the solution is heated at high temperatures and pressures to promote precipitation of hydrated oxide particles.

(2) Precursor oxide nanoparticles have high surface to volume ratio and diffusion distances are an order of magnitude shorter than that of micron-sized particles; consequently, Li-ions can diffuse in nanoparticles at significantly lower temperatures than in micron-sized particles.

(3) The diffusion of dopants in host oxides is also dependent on the structure of the oxide. If the oxide has an open structure and unoccupied substitutional and interstitial sites and can easily accept or lose oxygen at low temperatures (e.g., $TiO_2$), it will be easier for dopant cations to diffuse in the host oxide without a destructive transformation. For example, we were able to diffuse $Li^+$ in nanoparticles of anatase $TiO_{2-x}$ because anatase has unoccupied interstitial sites, and $TiO_{2-x}$ can accept oxygen at low enough temperatures at high partial pressures of oxygen by the following reaction:

$$TiO_{2-x} + yLi_i^* + \frac{y}{2}O_o \rightarrow Li_yTiO_{(2+\frac{y}{2}-x)} \qquad [2]$$

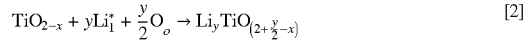

Therefore, the kinetics of $Li_4Ti_5O_{12}$ particle formation depends on the type of the solvent, solvent boiling point, which controls the refluxing temperature, and the primary particle size of $TiO_2$ powders. To investigate these factors, several experiments were performed.

EXAMPLES 1–3

Effect of the Solvent

In a first example attempts to synthesize $Li_4Ti_5O_{12}$ powders using water, $LiOH \cdot H_2O$ and nano-$TiO_2$ (average primary particle~20–25 nm) were made. 0.425 g of $LiOH \cdot H_2O$ was completely dissolved in 30 ml of water; subsequently, 1 g of nano-$TiO_2$ was added in the solution. After homogenously mixing nanopowder with the solution, it was refluxed for approximately 15 hrs. On completing the refluxing, water was evaporated. Dried powders were heat treated at 750° C. for four hours in oxygen, but x-ray diffraction analysis revealed that the powders did not transform to the $Li_4Ti_5O_{12}$ phase and contained a large proportion of unreacted $TiO_2$ material, along with other unidentified impurity peaks, suggesting that powders need to be heat-treated at much higher temperature. In a second example, similar results were also obtained for powders, which were synthesized using water, $Li_2CO_3$ and nano-$TiO_2$. $Li_2CO_3$ and nano-$TiO_2$ were mixed in stochiometric ratio.

On the other hand, in a third example, powders prepared by using methanol, $LiNO_3$ and nano-$TiO_2$ did not contain any unreacted $TiO_2$ powder, and the $Li_4Ti_5O_{12}$ was the predominant phase. In this example $LiNO_3$ (0.69 g) was dissolved in 20 ml of methanol. 1 g of nano-$TiO_2$ (average primary particle~20–25 nm) was mixed with this solution, and the $TiO_2/LiNO_3$/methanol mixture was refluxed for approximately 15 hrs. Excess amount of methanol was evaporated, and dried powder was heat-treated at 700° C. for 4 hrs in $O_2$.

EXAMPLE 4

Effect of the Boiling Point of the Organic Solvent

The boiling point of organic solvents is observed to have a significant effect on the kinetics of $Li_4Ti_5O_{12}$ phase formation. Nano-$TiO_2$ was reduced in a 95% Ar+5% $H_2$ atmosphere at 300° C. for 2 hrs to form $TiO_{2-x}$ particles. $Li_yTiO_{(2+y/2-x)}/LiNO_3/TiO_{2-x}$ mixture, prepared in a hexanol solution (BP=158° C.), transforms to lithium titanate phases at a much lower temperature than that prepared in methanol (BP=79° C.). The $Li_yTiO_{(2+y/2-x)}/LiNO_3/TiO_{2-x}$ mixture prepared in a methanol solution and annealed at 650° C. for 4 hrs in $O_2$ contains predominately rutile $TiO_2$ phase and a smaller amount of anatase and lithium titanate phases; on the other hand, on heating the $Li_yTiO_{(2+y/-x)}/LiNO_3/TiO_{2-x}$ mixture, prepared in a hexanol solution, at the same temperature and time, a large proportion of lithium titanate phases—$Li_4Ti_5O_{12}$ and $LiTiO_2$— were formed. Furthermore, the mixture prepared in a hexanol solution on heating did not exhibit anatase peaks in the X-ray diffraction pattern.

EXAMPLE 5

Effect of the $TiO_2$ Particle Size

On decreasing the particle size from micrometer to a nanometer scale, the diffusion distance of Li-ions reduces by an order of magnitude; consequently, Li-ions can diffuse into nanoparticles at much lower temperatures than those of coarse particles. To investigate the effect of the $TiO_2$ particle size on the reaction kinetics of $Li_4Ti_5O_{12}$ phase formation, commercial coarse $TiO_2$ powders (particle size—325 mesh size) were used to produce $Li_4Ti_5O_{12}$ particles by using the processing steps described in example 6 discussed below. Everything in the procedure was kept same except nano-$TiO_2$ powders were replaced with coarse $TiO_2$ powders. Powder X-ray diffraction reveals that a majority of $TiO_2$ has not been reacted, suggesting the importance of nanostructured $TiO_2$ in the synthesis of ultrafine $Li_4Ti_5O_{12}$ powders.

EXAMPLE 6

High Boiling Point Organic Solvent

Figure 2:
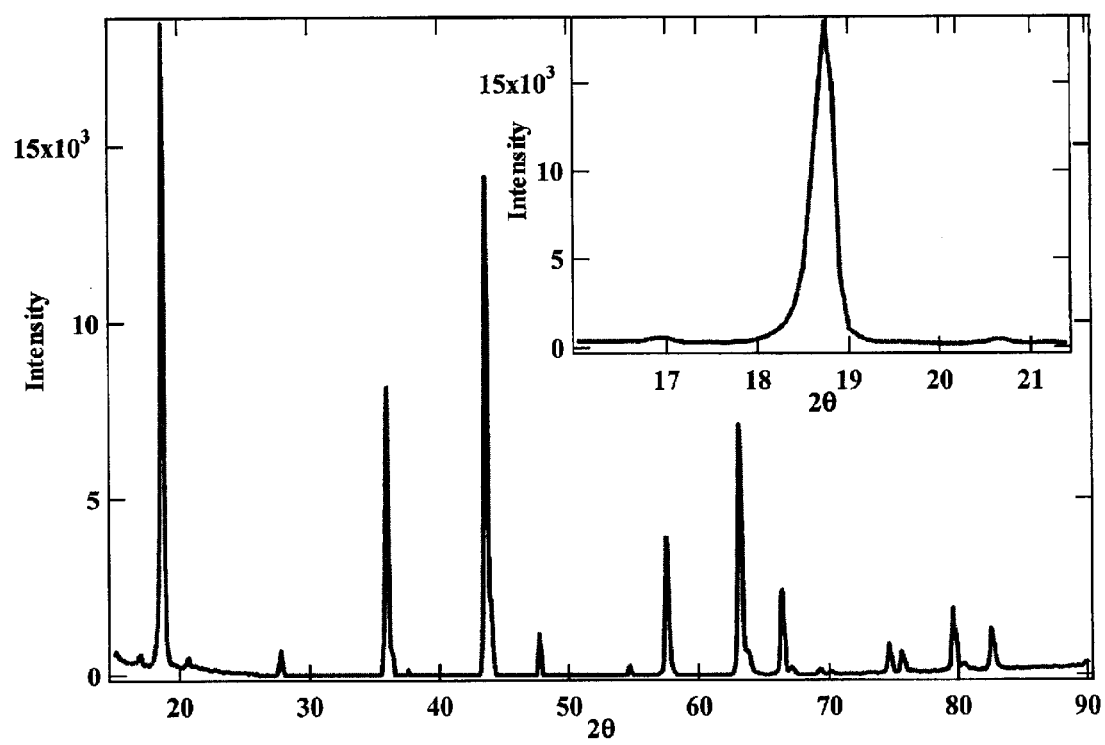
FIG. 2 is the x-ray diffraction pattern of the particles produced in accordance with the present invention.
Figure 4:
FIG. 4 is a photomicrograph of the $Li_4Ti_5O_{12}$ particles before heat treatment.

This Example illustrates a preferred embodiment for the preparation of nanostructured (or ultrafine) $Li_4Ti_5O_{12}$ powders as follows:

First, 2.14 g of $LiNO_3$ salt was added to 40 ml of hexanol, and the solution was stirred vigorously to dissolve the salt completely in hexanol in a single neck round-bottom flask. Next, 2.9 g of $TiO_2$ nanopowder with an average primary particle size in the range of 20–25 nm was added into the $LiNO_3$/hexanol solution. After homogenously mixing nanopowder with the solution, the mixed solution, while stirring, was refluxed at~155° C. for 15 hrs. On completing the refluxing step, hexanol solvent was evaporated at an atmospheric pressure by heating the solution. The evaporated solvent was condensed in a flask. Powder in the flask was mixed with distilled water to completely remove any residual powder in the flask. Powder was dried on a hot plate to remove any residual water. Dried powder was heat-treated at 700° C. for 4 hrs in oxygen to produce the $Li_4Ti_5O_{12}$ phase. XRD pattern of the powder, FIG. 2, exhibits clearly that predominant phase is the cubic spinel $Li_4Ti_5O_{12}$. TEM micrographs of powders before the heat-treatment and after the heat-treatment are shown in FIGS. 4 and 1, respectively.

As is well known the quantities set forth herein are for example only, such quantities can be scaled and adjusted in accordance with the teachings of this invention. The invention has been described with respect to preferred embodiments. However, as those skilled in the art will recognize, modifications and variations in the specific details which have been described and illustrated may be resorted to without departing from the spirit and scope of the invention as defined in the appended claims.

We claim:

1. A method of producing nanostructured $Li_4Ti_5O_{12}$ particles, comprising the following steps:
   a) dissolving a lithium containing salt in an organic solvent to form a liquid solution,
   b) adding a dispersion of nanoparticles of $TiO_2$ to the liquid solution, said $TiO_2$ nanoparticles having an average primary particle size of less than 100 nm;
   c) heating the liquid solution to facilitate diffusion of lithium ions into the nanoparticles;
   d) separating the solids from the liquid solution; and
   e) heat treating the solids to form a crystal structure, wherein the crystals are up to 100 nm in size.

2. The method as claimed in claim 1, wherein lithium salt is selected from the group consisting of: lithium nitrate, lithium hydroxide, lithium carbonate, lithium chloride, lithium acetate and lithium iodide.

3. The method as claimed in claim 1, wherein the organic solvent has a boiling point in the range of 79–250° C.

4. The method as claimed in claim 1, wherein the organic solvent has a boiling point of at least 100° C.

5. The method as claimed in claim 1, wherein average primary particle size of $TiO_2$ nanoparticles is in the range of 5–100 nm, and the average secondary (or aggregate) particle size is in the range of 25–1000 nm.

6. The method as claimed in claim 1, wherein the heating step (c) comprises refluxing.

7. The method as claimed in claim 1, wherein the heating step (c) comprises refluxing between 5 to 40 hrs.

8. The method as claimed in claim 1, wherein the heating step (c) is conducted at an atmospheric pressure in the range of 0.5 to 10 atmospheres.

9. The method as claimed in claim 1, wherein solid particles are separated from a liquid by at least one of the following methods: filtration, evaporation and centrifuging.

10. The method as claimed in claim 1, wherein the separated solids are heat-treated at a temperature in the range of 300–900° C.

11. The method as claimed in claim 1, wherein the separated solids are heat-treated at a temperature in the range of 600–800° C.

12. The method as claimed in claim 1, wherein the separated solids are heat-treated for a period in the range of 1–24 hrs.

13. The method as claimed in claim 1, wherein the separated solids are heat-treated for a period in the range of 2–8 hrs.

14. The method as claimed in claim 1, wherein the separated solids are heat-treated in an atmosphere containing $O_2$.

15. The method as claimed in claim 1, wherein separated solids are heat-treated in an atmosphere containing an inert gas.

16. The method as claimed in claim 15, wherein the inert gas is selected from the group consisting of $N_2$, He and Ar.

17. Nanostructured particles of $Li_4Ti_5O_{12}$ having a spinel type crystal structure and composed of crystals that are less than 100 nm in size produced by the process of claim 1.

18. Nanostructured $Li_4Ti_5O_{12}$ particles, having a spinel type crystal structure and wherein the particles are composed of crystals that are less than 100 nm in size; the collection of particles having an average diameter of less than about 300 nm.

19. The nanostructured $Li_4Ti_5O_{12}$ particles in claim 18, wherein the particles are composed of nano-sized crystals that are between 20–100 nm in size.

* * * * *